(12) United States Patent
Peng et al.

(10) Patent No.: US 10,935,769 B2
(45) Date of Patent: Mar. 2, 2021

(54) CAMERA OPTICAL LENS

(71) Applicant: AAC Technologies Pte. Ltd., Singapore (SG)

(72) Inventors: Haichao Peng, Shenzhen (CN); Chunhuan Fang, Shenzhen (CN); Hiroyuki Teraoka, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 56 days.

(21) Appl. No.: 16/525,600

(22) Filed: Jul. 30, 2019

(65) Prior Publication Data
US 2020/0041767 A1 Feb. 6, 2020

(30) Foreign Application Priority Data
Aug. 4, 2018 (CN) .......................... 201810881180.7

(51) Int. Cl.
| G02B 13/06 | (2006.01) |
| G02B 1/00 | (2006.01) |
| G02B 1/04 | (2006.01) |
| G02B 13/00 | (2006.01) |
| G02B 9/62 | (2006.01) |

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/06; G02B 1/00; G02B 1/041
See application file for complete search history.

(56) References Cited

U.S. PATENT DOCUMENTS

| 9,588,318 B2 * | 3/2017 | Chen | ................... G02B 13/0045 |
| 2012/0194726 A1 * | 8/2012 | Huang | ............... G02B 13/0045 348/340 |
| 2014/0218582 A1 * | 8/2014 | Chen | ....................... G02B 9/62 348/335 |
| 2015/0054994 A1 * | 2/2015 | Tsai | ....................... G02B 9/62 348/294 |

\* cited by examiner

*Primary Examiner* — Bumsuk Won
*Assistant Examiner* — Matthew Y Lee
(74) *Attorney, Agent, or Firm* — W&G Law Group LLP (57) ABSTRACT

An camera optical lens is disclosed. The camera optical lens includes, in sequence from an object side to an image side: a first lens, a second lens, a third lens, a fourth lens, a fifth lens, and a sixth lens. A focal length of the first lens is f1, an Abbe number of the first lens is v1, a focal length of the second lens is f2, an Abbe number of the second lens is v2, a curvature radius of an object side of the second lens is R3, a curvature radius of an image side of the second lens is R4, an on-axis distance from an image side of the first lens to the object side of the second lens is d2, a total optical length of the camera optical lens is TTL, and the following conditions are satisfied: $-15.0 \leq f2/f1 \leq -4.9$, $25.0 \leq TTL/d2 \leq 47.0$, $3.0 \leq v1/v2 \leq 7.0$, and $6.0 \leq (R3+R4)/(R3-R4) \leq 20.0$.

4 Claims, 6 Drawing Sheets

CAMERA OPTICAL LENS

TECHNICAL FIELD

The present disclosure relates to the field of optical lenses, more particular to a camera optical lens applicable to handheld terminal devices such as a smart phone and a digital camera, and the like.

BACKGROUND

In recent years, with the rise of smart phones, there is an increasing demand for miniature imaging lenses. However, photosensitive elements of ordinary imaging lenses are either charge coupled device (CCD) or complementary metal-oxide semiconductors (CMOS) sensors. As the pixel size of photosensitive elements decreases with the development of semiconductor manufacturing technologies and nowadays electronic products are developing toward more and better functions and a lightweight and thin structure, miniature imaging lenses having good imaging quality have become the mainstream in the current market.

To obtain better imaging quality, a conventional lens mounted on a camera of a mobile phone usually use a three-lens, four-lens, or even five-lens structure. With the development of technologies and the increasingly diversified demands of users, the pixel area of photosensitive elements is continuously decreased and increasingly higher requirements are imposed on the imaging quality of the system. To this end, a six-lens structure has been proposed. Although common six-lens structures have good optical performance, the setting of the Abbe number, the focal power, the distance between lenses, and the shapes of lenses are still not satisfactory, failing to meet the design requirements for ultra-thin structure, wide angle, and high luminous flux.

DETAILED DESCRIPTION

To make the objectives, technical solutions, and advantages of the present disclosure clearer, the following further describes embodiments of the present disclosure in detail with reference to the accompanying drawings. However, a person of ordinary skilled in the art may understand that in the embodiments of the present disclosure, many technique details are described to make readers better understand the present disclosure. However, the technical solutions as claimed in the present disclosure may also be realized even without these technique details or various variations and modifications made based on the following embodiments.

Embodiment 1

Figure 1:
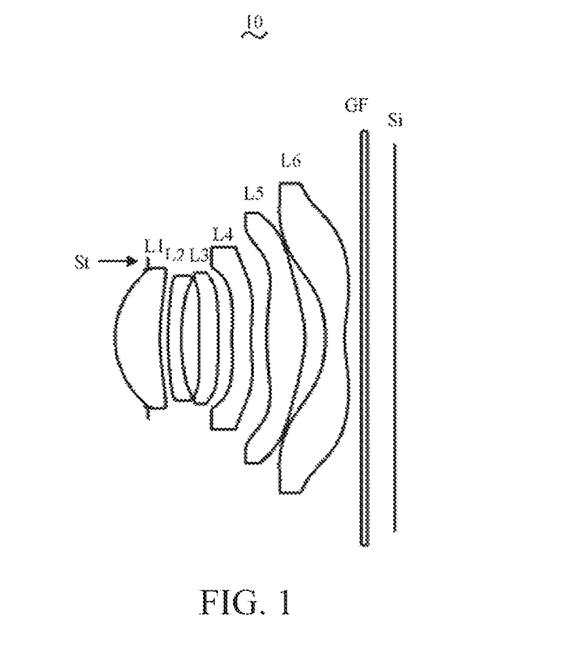
FIG. 1 is a schematic structural diagram of an camera optical lens according to embodiment 1 of the present disclosure.

Referring to the accompanying drawings, the present disclosure provides a camera optical lens 10. FIG. 1 shows the camera optical lens 10 according to embodiment 1 of the present disclosure. The camera optical lens 10 includes six lenses. Specifically, the camera optical lens 10 includes, in sequence from an object side to an image side: an aperture St, a first lens L1 having positive refractive power, a second lens L2 having negative refractive power, a third lens L3 having positive refractive power, a fourth lens L4 having negative refractive power, a fifth lens L5 having positive refractive power, and a sixth lens L6 having negative refractive power. Optical elements such as a glass filter (GF) of a filter having an IR cut-off filtering function may be disposed between the sixth lens L6 and an image surface Si.

In an embodiment, the aperture St is disposed between an object to be photographed and the first lens L1. The first lens L1 has positive refractive power, and has an object side which is a convex surface projecting outwardly and an image side which is a concave surface. The second lens L2 has negative refractive power, and has an object side which is a convex surface, and an image side which is a concave surface. The third lens L3 has positive refractive power, and has an object side which is a convex surface, and an image side which is a concave surface. The fourth lens L4 has negative refractive power, and has an object side which is a convex surface, and an image side which is a concave surface. The fifth lens L5 has positive refractive power, and has an object side and an image side which are both convex surfaces. The sixth lens L6 has negative refractive power, and in an embodiment, both an object side and an image side of the sixth lens L6 are concave surfaces.

It is defined herein that a focal length of the first lens L1 is f1, a focal length of the second lens L2 is f2, an on-axis distance from the image side of the first lens L1 to the object side of the second lens L2 is d2, a total optical length of the camera optical lens 10 is TTL, an Abbe number of the first lens L1 is v1, an Abbe number of the second lens L2 is v2, a curvature radius of the object side of the second lens L2 is R3, a curvature radius of the image side of the second lens L2 is R4, and the following conditions are satisfied:

$$-15.0 \leq f2/f1 \leq -4.9,$$

$$25.0 \leq TTL/d2 \leq 47.0,$$

$$3.0 \leq v1/v2 \leq 7.0, \text{ and}$$

$$6.0 \leq (R3+R4)/(R3-R4) \leq 20.0.$$

With the foregoing configuration of lenses, by effectively using the focal length f1 of the first lens L1 and the focal length f2 of the second lens L2 that have a particular relationship, and the total optical length TTL and the on-axis distance d2 from the image side of the first lens L1 to the object side of the second lens L2 that have a particular relationship, the optical system is enabled to meet the design requirements for ultra-thin structure and wide angle. By using the Abbe number v1 of the first lens L1 and the Abbe number v2 of the second lens L2 that have a particular relationship, system aberrations are better corrected. The shape of the second lens L2 is specified, so that high-order aberrations such as spherical aberrations are effectively corrected to ensure the imaging quality. Therefore, the system has better optical performance and is more suitable for high-resolution portable imaging elements.

Preferably, in an embodiment of the present disclosure, a curvature radius R1 of the object side of the first lens L1 and a curvature radius R2 of the image side of the first lens L1 satisfy the following conditions: $-4.0 \leq (R1+R2)/(R1-R2) \leq -1.8$. By means of this design, optical aberrations of the system can be effectively corrected.

Preferably, a focal length f of the entire camera optical lens 10 and the focal length f2 of the second lens L2 satisfy the following conditions: $-0.2 \leq f/f2 \leq 0.0$. By means of this design, focal power of the second lens is properly set while correcting the system aberrations, making it easier to achieve an ultra-thin structure.

Preferably, a curvature radius R11 of the object side of the sixth lens L6 and a curvature radius R12 of the image side of the sixth lens L6 satisfy the following conditions: $0.1 \leq (R11+R12)/(R11-R12) \leq 0.2$. By means of this design, the shape of the sixth lens L6 is set, so that the system aberrations can be effectively corrected.

In addition, a surface of the lens can be set to be an aspheric surface, and the aspheric surface can be easily fabricated into a shape other than a spherical surface to obtain more control variables for reducing aberrations, thereby reducing the quantity of lenses used. Therefore, the total length of the camera optical lens in the present disclosure can be effectively reduced. In an embodiment of the present disclosure, the object side and the image side of each lens are all aspheric.

Preferably, an inflection point and/or a stationary point may be further disposed on the object side and/or the image side of the lens, to meet the requirement for high-quality imaging. Specific implementation solutions are described below.

The following shows design data of the camera optical lens 10 according to the first embodiment of the present disclosure, where the focal length, distance, radius, and the center thickness are measured in millimeters (mm).

Table 1 and Table 2 show the design data of the camera optical lens 10 in embodiment 1 of the present disclosure.

TABLE 1

|     |     | Curvature radius (R) (mm) | Thickness/distance (d) (mm) | | Refractive index (nd) | | Abbe number (vd) |
| --- | --- | --- | --- | --- | --- | --- | --- |
| St  | St  | ∞ | d0= | −0.581 | | | |
| L1  | R1  | 1.6044 | d1= | 0.791 | nd1 | 1.5267 v1 | 76.70 |
|     | R2  | 3.9643 | d2= | 0.140 | | | |
| L2  | R3  | 4.4698 | d3= | 0.240 | nd2 | 1.6710 v2 | 19.24 |
|     | R4  | 3.7659 | d4= | 0.316 | | | |
| L3  | R5  | 19.2615 | d5= | 0.332 | nd3 | 1.5440 v3 | 56.04 |
|     | R6  | 36.1330 | d6= | 0.250 | | | |
| L4  | R7  | 6.9603 | d7= | 0.334 | nd4 | 1.6150 v4 | 25.96 |
|     | R8  | 3.6526 | d8= | 0.277 | | | |
| L5  | R9  | 4.6225 | d9= | 0.674 | nd5 | 1.5440 v5 | 56.04 |
|     | R10 | −2.1801 | d10= | 0.363 | | | |
| L6  | R11 | −2.9815 | d11= | 0.342 | nd6 | 1.5350 v6 | 56.11 |
|     | R12 | 2.2495 | d12= | 0.300 | | | |
| Glass | R13 | ∞ | d13= | 0.110 | ndg | 1.5168 vg | 64.17 |
|     | R14 | ∞ | d14= | 0.481 | | | |

Meanings of the symbols are as follows:

St: aperture;

R: curvature radius of optical surface; center curvature radius in the case of a lens;

R1: curvature radius of object side of first lens L1;

R2: curvature radius of image side of first lens L1;

R3: curvature radius of object side of second lens L2;

R4: curvature radius of image side of second lens L2;

R5: curvature radius of object side of third lens L3;

R6: curvature radius of image side of third lens L3;

R7: curvature radius of object side of fourth lens L4;

R8: curvature radius of image side of fourth lens L4;

R9: curvature radius of object side of fifth lens L5;

R10: curvature radius of image side of fifth lens L5;

R11: curvature radius of object side of sixth lens L6;

R12: curvature radius of image side of sixth lens L6;

R13: curvature radius of object side of optical filter GF;

R14: curvature radius of image side of optical filter GF;

d: on-axis thickness of lens; on-axis distance between lenses;

d0: on-axis distance from aperture St to object side of first lens L1;

d1: on-axis thickness of first lens L1;

d2: on-axis distance from image side of first lens L1 to object side of second lens L2;

d3: on-axis thickness of second lens L2;

d4: on-axis distance from image side of second lens L2 to object side of third lens d5: on-axis thickness of third lens L3;

d6: on-axis distance from image side of third lens L3 to object side of fourth lens L4;

d7: on-axis thickness of fourth lens L4;

d8: on-axis distance from image side of fourth lens L4 to object side of fifth lens L5;

d9: on-axis thickness of fifth lens L5;

d10: on-axis distance from image side of fifth lens L5 to object side of sixth lens L6;

d11: on-axis thickness of sixth lens L6;

d12: on-axis distance from image side of sixth lens L6 to object side of optical filter d13: on-axis thickness of optical filter GF;

d14: on-axis distance from image side to image surface of optical filter GF;

nd: refractive index at D line nd1: refractive index of first lens L1;

nd2: refractive index of second lens L2;

nd3: refractive index of third lens L3;

nd4: refractive index of fourth lens L4;

nd5: refractive index of fifth lens L5;

nd6: refractive index of sixth lens L6;

ndg: refractive index of optical filter GF;

vd: Abbe number v1: Abbe number of first lens L1;

v2: Abbe number of second lens L2;

v3: Abbe number of third lens L3;

v4: Abbe number of fourth lens L4;

v5: Abbe number of fifth lens L5;

v6: Abbe number of sixth lens L6; and vg: Abbe number of optical filter GF.

TABLE 2

| Focal length (mm) | |
| --- | --- |
| f | 4.262 |
| f1 | 4.575 |
| f2 | −40.941 |
| f3 | 75.049 |
| f4 | −12.910 |
| f5 | 2.812 |
| f6 | −2.335 |

Meanings of the symbols are as follows:

f: focal length of camera optical lens 10;

f1: focal length of first lens L1;

f2: focal length of second lens L2;

f3: focal length of third lens L3;

f4: focal length of fourth lens L4;

f5: focal length of fifth lens L5; and f6: focal length of sixth lens L6.

Table 3 shows data of aspheric surfaces of the lenses of the camera optical lens 10 in embodiment 1 of the present disclosure.

TABLE 3

| | Conic coefficient | Aspheric coefficient | | | |
| --- | --- | --- | --- | --- | --- |
| | k | A4 | A6 | A8 | A10 |
| R1 | −3.5000E−01 | 2.6813E−03 | 4.5269E−02 | −1.4748E−01 | 3.1482E−01 |
| R2 | 8.6177E+00 | −5.3291E−02 | −8.8059E−03 | −3.3986E−03 | 4.2844E−02 |
| R3 | 1.3240E+01 | −9.1040E−02 | 6.6499E−02 | −3.0571E−01 | 1.0758E+00 |
| R4 | 8.9649E+00 | −4.9221E−02 | −4.4505E−02 | 5.2925E−01 | −2.2361E+00 |
| R5 | −6.3288E+01 | −5.5571E−02 | −2.1362E−02 | 2.0852E−01 | −1.2489E+00 |
| R6 | −9.9000E+01 | −9.0134E−02 | −4.3151E−02 | 5.2958E−01 | −1.8925E+00 |
| R7 | 1.4915E+01 | −2.6406E−01 | 2.2064E−01 | −2.1165E−01 | 1.5848E−01 |
| R8 | −2.5813E+01 | −2.0819E−01 | 1.4393E−01 | −1.2371E−01 | 1.0683E−01 |
| R9 | −2.5341E+01 | −2.8440E−03 | −6.7926E−02 | 9.5051E−02 | −8.9517E−02 |
| R10 | −5.3166E+00 | 5.5898E−02 | −8.7145E−02 | 9.5077E−02 | −5.7524E−02 |
| R11 | −8.6893E−01 | −1.9178E−01 | 1.2992E−01 | −5.2232E−02 | 1.9469E−02 |
| R12 | −2.0471E+01 | −1.1021E−01 | 6.1929E−02 | −2.4475E−02 | 6.1752E−03 |

| | Aspheric coefficient | | | | |
| --- | --- | --- | --- | --- | --- |
| | A12 | A14 | A16 | A18 | A20 |
| R1 | −4.1436E−01 | 3.3993E−01 | −1.6922E−01 | 4.6682E−02 | −5.5705E−03 |
| R2 | −1.5089E−01 | 2.4087E−01 | −2.1007E−01 | 9.5711E−02 | −1.8079E−02 |
| R3 | −2.1732E+00 | 2.6915E+00 | −2.0233E+00 | 8.4901E−01 | −1.5310E−01 |
| R4 | 5.9517E+00 | −9.7283E+00 | 9.5442E+00 | −5.1625E+00 | 1.1903E+00 |
| R5 | 3.6035E+00 | −6.1620E+00 | 6.2719E+00 | −3.5178E+00 | 8.3767E−01 |
| R6 | 3.5965E+00 | −4.2158E+00 | 3.0373E+00 | −1.2376E+00 | 2.1915E−01 |
| R7 | −1.2653E−01 | 7.7363E−02 | −2.5423E−02 | 2.0944E−03 | 3.8596E−04 |
| R8 | −8.8737E−02 | 5.8933E−02 | −2.4026E−02 | 5.1270E−03 | −4.3950E−04 |
| R9 | 5.2955E−02 | −2.0355E−02 | 4.8921E−03 | −6.5215E−04 | 3.6289E−05 |
| R10 | 1.9964E−02 | −4.1553E−03 | 5.1907E−04 | −3.6816E−05 | 1.1893E−06 |
| R11 | −5.8950E−03 | 1.1941E−03 | −1.4708E−04 | 9.9698E−06 | −2.8618E−07 |
| R12 | −9.6369E−04 | 7.6446E−05 | −3.4950E−07 | −3.4634E−07 | 1.5449E−08 |

K is a conic coefficient, and A4, A6, A8, A10, A12, A14, and A16 are aspheric coefficients. IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \qquad (1)$$

For convenience, aspheric surfaces shown in the above formula (1) are used as the aspheric surfaces of the lenses. However, the present disclosure is not limited to the aspheric surface polynomial form shown in the formula (1).

Table 4 and Table 5 show design data of inflection points and stationary points of the lenses in the camera optical lens 10 in an embodiment of the present disclosure. R1 and R2 respectively represent the object side and the image side of the first lens L1, R3 and R4 respectively represent the object side and the image side of the second lens L2, R5 and R6 respectively represent the object side and the image side of the third lens L3, R7 and R8 respectively represent the object side and the image side of the fourth lens L4, R9 and R10 respectively represent the object side and the image side of the fifth lens L5, and R11 and R12 respectively represent the object side and the image side of the sixth lens L6. Corresponding data in the column "Inflection point position" is a vertical distance from an inflection point set on the surface of each lens to an optical axis of the camera optical lens 10, and corresponding data in the column "Stationary point position" is a vertical distance from a stationary point set on the surface of each lens to the optical axis of the camera optical lens 10.

TABLE 4

|  | Quantity of inflection points | Inflection point position 1 | Inflection point position 2 | Inflection point position 3 |
|---|---|---|---|---|
| R1 | 1 | 1.235 | | |
| R2 | 1 | 0.765 | | |
| R3 | | | | |
| R4 | | | | |
| R5 | 2 | 0.275 | 1.015 | |
| R6 | 2 | 0.165 | 1.125 | |
| R7 | 1 | 0.235 | | |
| R8 | 3 | 0.325 | 1.275 | 1.625 |
| R9 | 2 | 0.605 | 1.705 | |
| R10 | 3 | 0.965 | 1.245 | 2.215 |
| R11 | 2 | 1.225 | 2.525 | |
| R12 | 3 | 0.445 | 2.365 | 2.755 |

TABLE 5

|  | Quantity of stationary points | Stationary point position 1 |
|---|---|---|
| R1 | | |
| R2 | | |
| R3 | | |
| R4 | | |
| R5 | 1 | 0.465 |
| R6 | 1 | 0.275 |
| R7 | 1 | 0.415 |
| R8 | 1 | 0.585 |
| R9 | 1 | 1.025 |
| R10 | | |
| R11 | 1 | 2.345 |
| R12 | 1 | 0.965 |

Figure 2:
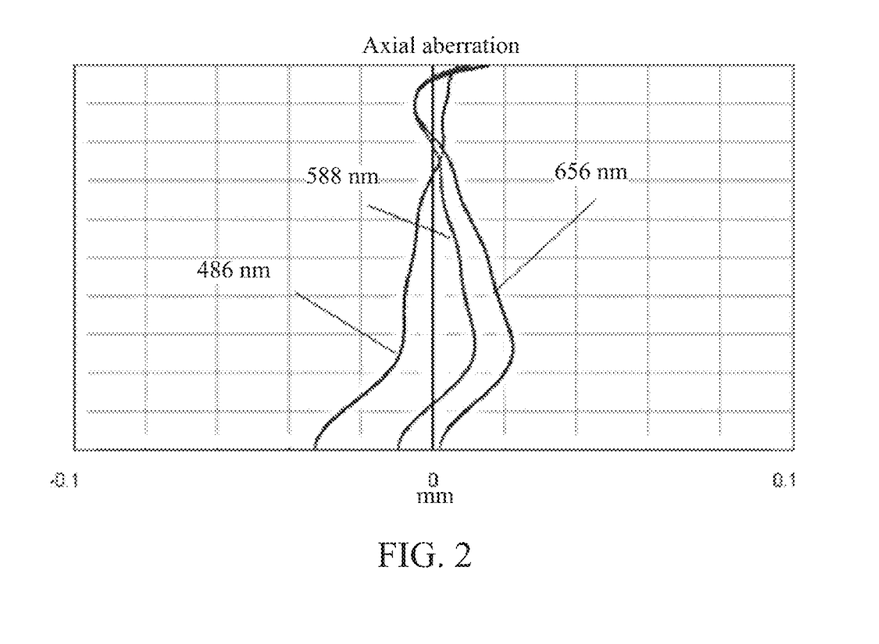
FIG. 2 is a schematic diagram of an axial aberration of the camera optical lens shown in FIG. 1.
Figure 3:
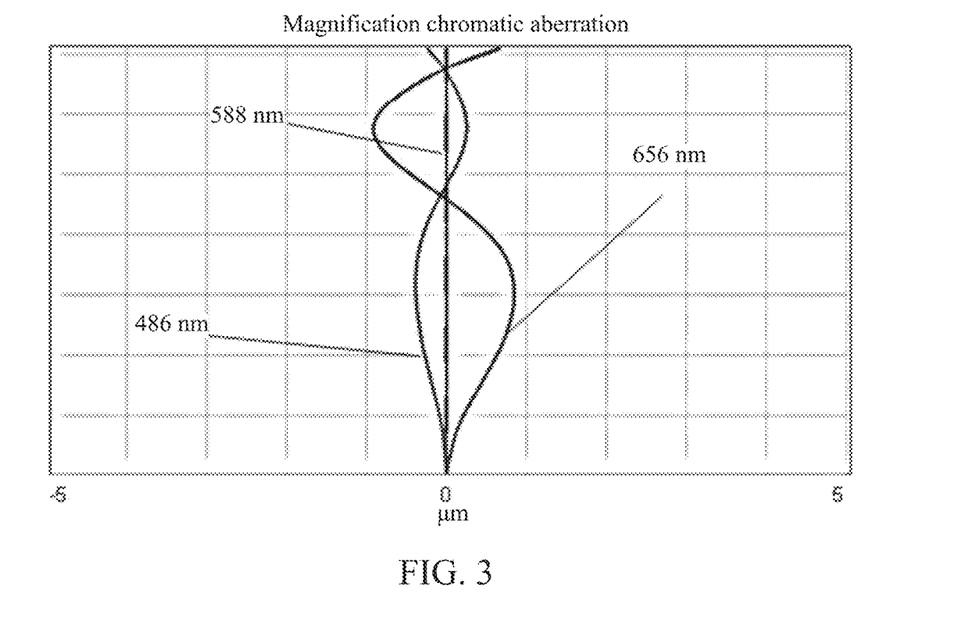
FIG. 3 is a schematic diagram of a magnification chromatic aberration of the camera optical lens shown in FIG. 1.
Figure 4:
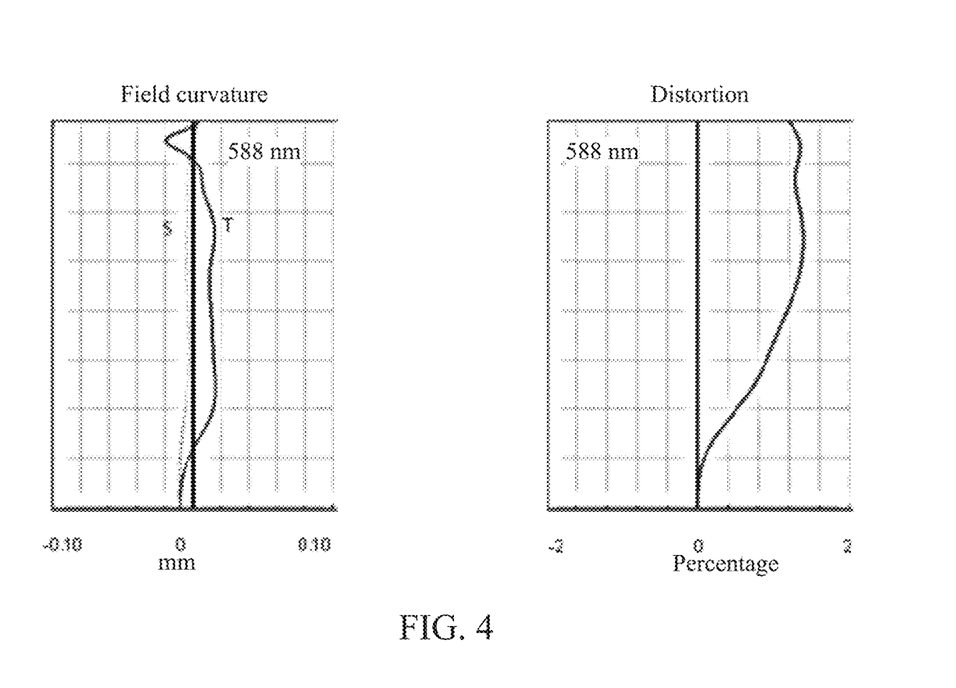
FIG. 4 is a schematic diagram of a field curvature and distortion of the camera optical lens shown in FIG. 1.
Figure 5:
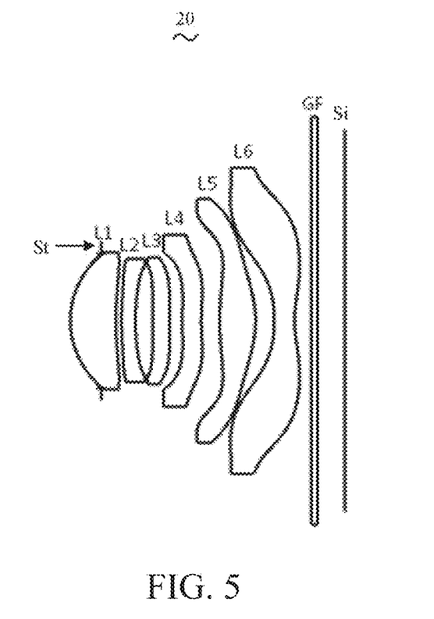
FIG. 5 is a schematic structural diagram of an camera optical lens according to embodiment 2 of the present disclosure.

FIG. 2 and FIG. 3 are respectively schematic diagrams of axial aberrations and magnification chromatic aberrations obtained when light having wavelengths of 486 nm, 588 nm and 656 nm pass through the camera optical lens 10 in the first embodiment. FIG. 4 is a schematic diagram of a field curvature and distortion obtained when light having a wavelength of 588 nm passes through the camera optical lens 10 in the first embodiment. In FIG. 4, S is a field curvature in a sagittal direction, and T is a field curvature in a meridional direction.

Table 6 below lists values corresponding to the conditions in an embodiment of the present disclosure. Apparently, the camera optical lens 10 in the embodiment satisfies the foregoing conditions.

In an embodiment, an entrance-pupil diameter of the camera optical lens is 2.522 mm, a full-field image height is 3.552 mm, and a field of view in a diagonal direction is 78.586°. The camera optical lens has a wide angle and ultra-thin structure, with its on-axis and off-axis chromatic aberrations being sufficiently corrected, and has excellent optical properties.

Embodiment 2

The embodiment 2 is basically the same as the embodiment 1, and symbols in the embodiment 2 have the same meanings as those in the embodiment 1. Only differences between the embodiment 2 and the embodiment 1 are listed below.

Table 6 and Table 7 show design data of a camera optical lens 20 in the embodiment 2 of the present disclosure.

TABLE 6

|  |  | Curvature radius (R) (mm) | Thickness/distance (d) (mm) | | Refractive index (nd) | | Abbe number (vd) |
|---|---|---|---|---|---|---|---|
| St | St | ∞ | d0= | −0.555 | | | |
| L1 | R1 | 1.6363 | d1= | 0.819 | nd1 | 1.5300 v1 | 62.06 |
|  | R2 | 4.6656 | d2= | 0.105 | | | |
| L2 | R3 | 5.3880 | d3= | 0.248 | nd2 | 1.6710 v2 | 19.24 |
|  | R4 | 3.8521 | d4= | 0.310 | | | |
| L3 | R5 | 26.8978 | d5= | 0.310 | nd3 | 1.5440 v3 | 56.04 |
|  | R6 | 68.1478 | d6= | 0.228 | | | |
| L4 | R7 | 6.6280 | d7= | 0.341 | nd4 | 1.6150 v4 | 25.96 |
|  | R8 | 4.1655 | d8= | 0.332 | | | |
| L5 | R9 | 5.6774 | d9= | 0.646 | nd5 | 1.5440 v5 | 56.04 |
|  | R10 | −1.8900 | d10= | 0.336 | | | |
| L6 | R11 | −2.9549 | d11= | 0.366 | nd6 | 1.5350 v6 | 56.11 |
|  | R12 | 1.9680 | d12= | 0.300 | | | |
| Glass | R13 | ∞ | d13= | 0.110 | ndg | 1.5168 vg | 64.17 |
|  | R14 | ∞ | d14= | 0.499 | | | |

TABLE 7

| Focal length (mm) | |
| --- | --- |
| f | 4.231 |
| f1 | 4.335 |
| f2 | −21.346 |
| f3 | 81.190 |
| f4 | −19.117 |
| f5 | 2.678 |
| f6 | −2.145 |

Table 8 shows data of aspheric surfaces of the lenses of the camera optical lens 20 in the embodiment 2 of the present disclosure.

TABLE 8

| | Conic coefficient | Aspheric coefficient | | | |
| --- | --- | --- | --- | --- | --- |
| | k | A4 | A6 | A8 | A10 |
| R1 | −3.6024E−01 | 2.8625E−03 | 4.4156E−02 | −1.4745E−01 | 3.2647E−01 |
| R2 | 9.3076E+00 | −7.5233E−02 | 7.1185E−03 | 8.6716E−03 | 2.7685E−02 |
| R3 | 1.5319E+01 | −1.1822E−01 | 8.1114E−02 | −2.0176E−01 | 7.5875E−01 |
| R4 | 8.5733E+00 | −6.1395E−02 | −7.6375E−03 | 3.6568E−01 | −1.5009E+00 |
| R5 | −2.8986E+01 | −5.2505E−02 | −1.0864E−02 | 1.5960E−01 | −1.0167E+00 |
| R6 | 9.9000E+01 | −1.1562E−01 | 1.0223E−01 | 1.3519E−01 | −1.2837E+00 |
| R7 | 1.2898E+01 | −2.9124E−01 | 3.5855E−01 | −8.0932E−01 | 1.7296E+00 |
| R8 | −2.1345E+01 | −2.3089E−01 | 2.2359E−01 | −3.8473E−01 | 5.6647E−01 |
| R9 | −2.4850E+01 | 1.0617E−02 | −7.0050E−02 | 8.7564E−02 | −8.3494E−02 |
| R10 | −4.9198E+00 | 6.4533E−02 | −9.0273E−02 | 9.4661E−02 | −5.5466E−02 |
| R11 | −8.9422E−01 | −1.8172E−01 | 1.2042E−01 | −5.1361E−02 | 2.1603E−02 |
| R12 | −1.7710E+01 | −1.0189E−01 | 5.3766E−02 | −2.0023E−02 | 4.7208E−03 |

| | Aspheric coefficient | | | | |
| --- | --- | --- | --- | --- | --- |
| | A12 | A14 | A16 | A18 | A20 |
| R1 | −4.4825E−01 | 3.8445E−01 | −2.0037E−01 | 5.7996E−02 | −7.2777E−03 |
| R2 | −1.0917E−01 | 1.5727E−01 | −1.2754E−01 | 5.5850E−02 | −1.0178E−02 |
| R3 | −1.5179E+00 | 1.7598E+00 | −1.2095E+00 | 4.6030E−01 | −7.4583E−02 |
| R4 | 4.0584E+00 | −6.9024E+00 | 7.0436E+00 | −3.9401E+00 | 9.3384E−01 |
| R5 | 2.8815E+00 | −4.9860E+00 | 5.2623E+00 | −3.1075E+00 | 7.8452E−01 |
| R6 | 3.2028E+00 | −4.4544E+00 | 3.6371E+00 | −1.6307E+00 | 3.1123E−01 |
| R7 | −2.7149E+00 | 2.7642E+00 | −1.7333E+00 | 6.1177E−01 | −9.3543E−02 |
| R8 | −5.7512E−01 | 3.7301E−01 | −1.4334E−01 | 2.9461E−02 | −2.4896E−03 |
| R9 | 5.1435E−02 | −2.0957E−02 | 5.3523E−03 | −7.5183E−04 | 4.3647E−05 |
| R10 | 1.8028E−02 | −3.3242E−03 | 3.3863E−04 | −1.7441E−05 | 3.7016E−07 |
| R11 | −7.0198E−03 | 1.4618E−03 | −1.8209E−04 | 1.2424E−05 | −3.5870E−07 |
| R12 | −6.7875E−04 | 4.3821E−05 | 1.6541E−06 | −3.9742E−07 | 1.5489E−08 |

Table 9 and Table 10 show design data of inflection points and stationary points of the lenses in the camera optical lens 20 in the embodiment 2 of the present disclosure.

TABLE 9

| | Quantity of inflection points | Inflection point position 1 | Inflection point position 2 | Inflection point position 3 |
| --- | --- | --- | --- | --- |
| R1 | 1 | 1.215 | | |
| R2 | 1 | 0.615 | | |
| R3 | 2 | 0.465 | 0.665 | |
| R4 | | | | |
| R5 | 2 | 0.245 | 1.015 | |
| R6 | 2 | 0.105 | 1.105 | |
| R7 | 1 | 0.235 | | |
| R8 | 2 | 0.305 | 1.215 | |
| R9 | 2 | 0.655 | 1.695 | |
| R10 | 3 | 0.915 | 1.235 | 2.215 |
| R11 | 2 | 1.235 | 2.515 | |
| R12 | 3 | 0.465 | 2.365 | 2.765 |

TABLE 10

| | Quantity of stationary points | Stationary point position 1 |
| --- | --- | --- |
| R1 | | |
| R2 | 1 | 1.085 |
| R3 | | |
| R4 | | |
| R5 | 1 | 0.415 |
| R6 | 1 | 0.185 |
| R7 | 1 | 0.405 |
| R8 | 1 | 0.545 |
| R9 | 1 | 1.035 |
| R10 | | |

TABLE 10-continued

| | Quantity of stationary points | Stationary point position 1 |
| --- | --- | --- |
| R11 | 1 | 2.285 |
| R12 | 1 | 1.045 |

Figure 6:
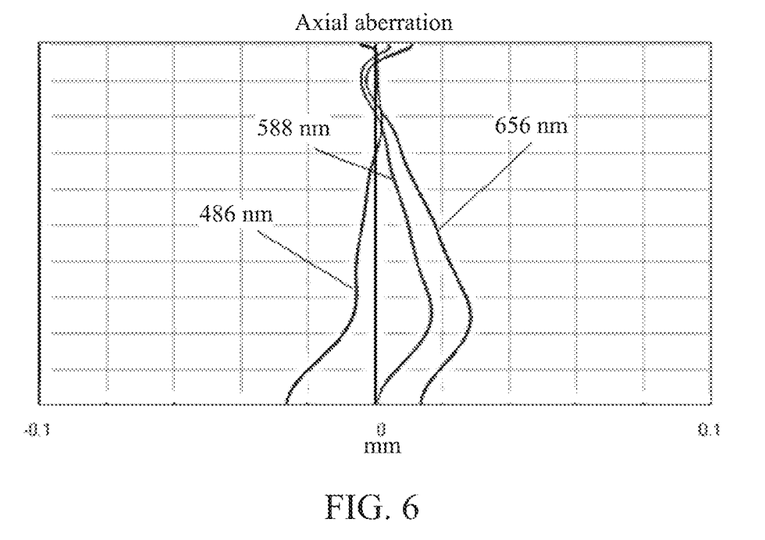
FIG. 6 is a schematic diagram of an axial aberration of the camera optical lens shown in FIG. 5.
Figure 7:
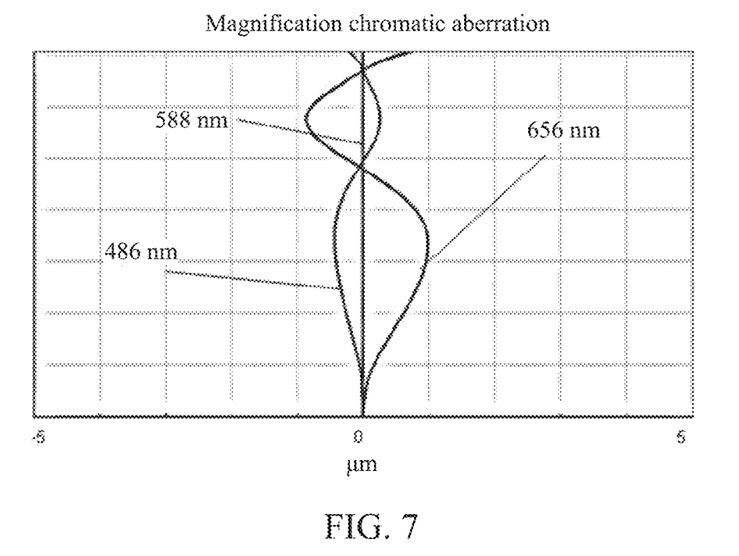
FIG. 7 is a schematic diagram of a magnification chromatic aberration of the camera optical lens shown in FIG. 5.
Figure 8:
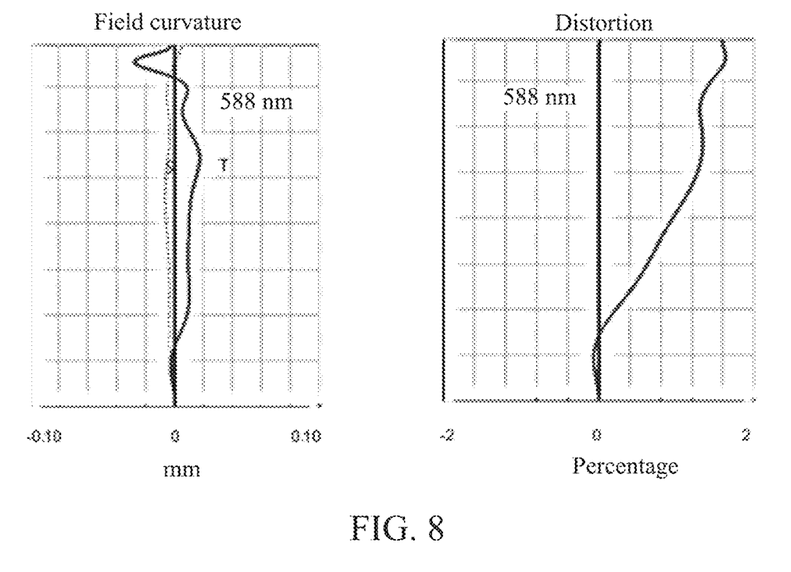
FIG. 8 is a schematic diagram of a field curvature and distortion of the camera optical lens shown in FIG. 5.
Figure 9:
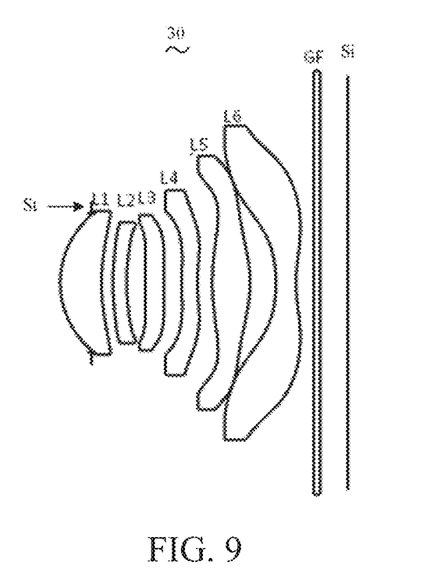
FIG. 9 is a schematic structural diagram of an camera optical lens according to embodiment 3 of the present disclosure.

FIG. 6 and FIG. 7 are respectively schematic diagrams of axial aberrations and magnification chromatic aberrations obtained when light having wavelengths of 486 nm, 588 nm and 656 nm pass through the camera optical lens 20 in embodiment 2. FIG. 8 is a schematic diagram of a field curvature and distortion obtained when light having a wavelength of 588 nm passes through the camera optical lens 20 in embodiment 2.

Table 16 below lists values corresponding to the conditions in an embodiment of the present disclosure. Apparently, the camera optical lens 20 in an embodiment satisfies the foregoing conditions.

In an embodiment, an entrance-pupil diameter of the camera optical lens is 2.503 mm, a full-field image height is 3.552 mm, and a field of view in a diagonal direction is 79°. The camera optical lens has a wide angle and ultra-thin structure, with its on-axis and off-axis chromatic aberrations being sufficiently corrected, and has excellent optical properties.

Embodiment 3

The embodiment 3 is basically the same as the embodiment 1, and symbols in the embodiment 3 have the same meanings as those in the embodiment 1. Only differences between the embodiment 3 and the embodiment 1 are listed below.

Table 11 and Table 12 show design data of a camera optical lens 30 in the embodiment 3 of the present disclosure.

TABLE 11

|  |  | Curvature radius (R) (mm) | Thickness/distance (d) (mm) | | Refractive index (nd) | | Abbe number (vd) |
|---|---|---|---|---|---|---|---|
| St | St | ∞ | d0= | −0.541 | | | |
| L1 | R1 | 1.6226 | d1= | 0.710 | nd1 | 1.5173 | v1 | 95.00 |
|  | R2 | 3.6766 | d2= | 0.195 | | | |
| L2 | R3 | 4.1274 | d3= | 0.235 | nd2 | 1.6830 | v2 | 17.50 |
|  | R4 | 3.7343 | d4= | 0.316 | | | |
| L3 | R5 | 11.4371 | d5= | 0.330 | nd3 | 1.5440 | v3 | 56.04 |
|  | R6 | 40.1530 | d6= | 0.300 | | | |
| L4 | R7 | 5.7771 | d7= | 0.269 | nd4 | 1.6150 | v4 | 25.96 |
|  | R8 | 2.8778 | d8= | 0.256 | | | |
| L5 | R9 | 4.2636 | d9= | 0.649 | nd5 | 1.5440 | v5 | 56.04 |
|  | R10 | −2.2387 | d10= | 0.443 | | | |
| L6 | R11 | −2.9794 | d11= | 0.345 | nd6 | 1.5350 | v6 | 56.11 |
|  | R12 | 2.4203 | d12= | 0.300 | | | |
| Glass | R13 | ∞ | d13= | 0.110 | ndg | 1.5168 | vg | 64.17 |
|  | R14 | ∞ | d14= | 0.485 | | | |

TABLE 12

| | Focal length (mm) |
|---|---|
| f | 4.213 |
| f1 | 5.012 |
| f2 | −75.179 |
| f3 | 29.178 |
| f4 | −9.601 |
| f5 | 2.787 |
| f6 | −2.434 |

Table 13 shows data of aspheric surfaces of the lenses of the camera optical lens 30 in the embodiment 3 of the present disclosure.

TABLE 13

| | Conic coefficient | Aspheric coefficient | | | |
|---|---|---|---|---|---|
| | k | A4 | A6 | A8 | A10 |
| R1 | −3.5258E−01 | −5.4862E−03 | 1.0196E−01 | −3.8343E−01 | 8.9351E−01 |
| R2 | 8.2420E+00 | −5.0434E−02 | 7.1227E−02 | −5.0285E−01 | 1.7549E+00 |
| R3 | 1.1783E+01 | −9.3334E−02 | 9.6001E−02 | −4.8002E−01 | 1.6571E+00 |
| R4 | 6.8479E+00 | −5.8993E−02 | −6.2674E−02 | 6.1839E−01 | −2.4847E+00 |
| R5 | −9.1109E+01 | −5.6318E−02 | −7.0160E−02 | 4.2569E−01 | −2.0639E+00 |
| R6 | −2.5604E+01 | −5.7045E−02 | −2.2960E−01 | 1.1412E+00 | −3.2811E+00 |
| R7 | 1.4965E+01 | −2.7961E−01 | 1.2308E−01 | 1.3321E−01 | −3.9316E−01 |
| R8 | −2.3147E+01 | −1.7459E−01 | −3.8145E−02 | 2.9425E−01 | −4.4351E−01 |
| R9 | −1.1385E+01 | 3.0275E−02 | −1.3211E−01 | 1.7735E−01 | −1.5263E−01 |
| R10 | −9.2618E+00 | 4.0425E−02 | −2.2813E−02 | 4.5557E−03 | 1.0294E−02 |
| R11 | −7.9298E−01 | −1.3321E−01 | 6.9788E−02 | −3.7922E−02 | 2.6379E−02 |
| R12 | −1.7941E+01 | −9.6907E−02 | 4.6846E−02 | −1.8030E−02 | 4.7370E−03 |

| | Aspheric coefficient | | | | |
|---|---|---|---|---|---|
| | A12 | A14 | A16 | A18 | A20 |
| R1 | −1.2898E+00 | 1.1647E+00 | −6.4014E−01 | 1.9568E−01 | −2.5565E−02 |
| R2 | −3.6541E+00 | 4.5965E+00 | −3.4441E+00 | 1.4153E+00 | −2.4638E−01 |
| R3 | −3.4297E+00 | 4.4179E+00 | −3.4753E+00 | 1.5307E+00 | −2.9059E−01 |
| R4 | 6.2679E+00 | −9.7231E+00 | 9.0648E+00 | −4.6618E+00 | 1.0209E+00 |
| R5 | 5.5127E+00 | −8.9035E+00 | 8.5979E+00 | −4.5782E+00 | 1.0349E+00 |
| R6 | 5.6631E+00 | −6.1987E+00 | 4.2183E+00 | −1.6330E+00 | 2.7573E−01 |
| R7 | 3.9967E−01 | −2.2990E−01 | 8.0476E−02 | −1.7246E−02 | 1.9459E−03 |
| R8 | 3.7139E−01 | −1.8640E−01 | 5.5867E−02 | −9.2526E−03 | 6.5220E−04 |
| R9 | 8.5152E−02 | −3.0834E−02 | 6.8666E−03 | −8.4041E−04 | 4.2901E−05 |

TABLE 13-continued

| | | | | |
|---|---|---|---|---|
| R10 | −9.8841E−03 | 3.8399E−03 | −7.6903E−04 | 7.8299E−05 | −3.2026E−06 |
| R11 | −1.1035E−02 | 2.5694E−03 | −3.3714E−04 | 2.3505E−05 | −6.7995E−07 |
| R12 | −7.5961E−04 | 5.3508E−05 | 1.7246E−06 | −4.6346E−07 | 1.8252E−08 |

Table 14 and Table 15 show design data of inflection points and stationary points of the lenses in the camera optical lens 30 in the embodiment 3 of the present disclosure.

TABLE 14

| | Quantity of inflection points | Inflection point position 1 | Inflection point position 2 | Inflection point position 3 |
|---|---|---|---|---|
| R1 | | | | |
| R2 | 1 | 0.945 | | |
| R3 | | | | |
| R4 | | | | |
| R5 | 1 | 0.325 | | |
| R6 | 2 | 0.175 | 1.125 | |
| R7 | 1 | 0.245 | | |
| R8 | 3 | 0.345 | 1.305 | 1.575 |
| R9 | 2 | 0.725 | 1.785 | |
| R10 | 3 | 0.805 | 1.365 | 2.205 |
| R11 | 1 | 1.275 | | |
| R12 | 2 | 0.475 | 2.425 | |

TABLE 15

| | Quantity of stationary points | Stationary point position 1 |
|---|---|---|
| R1 | | |
| R2 | | |
| R3 | | |
| R4 | | |
| R5 | 1 | 0.535 |
| R6 | 1 | 0.295 |
| R7 | 1 | 0.435 |
| R8 | 1 | 0.635 |
| R9 | 1 | 1.215 |
| R10 | | |
| R11 | | |
| R12 | 1 | 0.995 |

Figure 10:
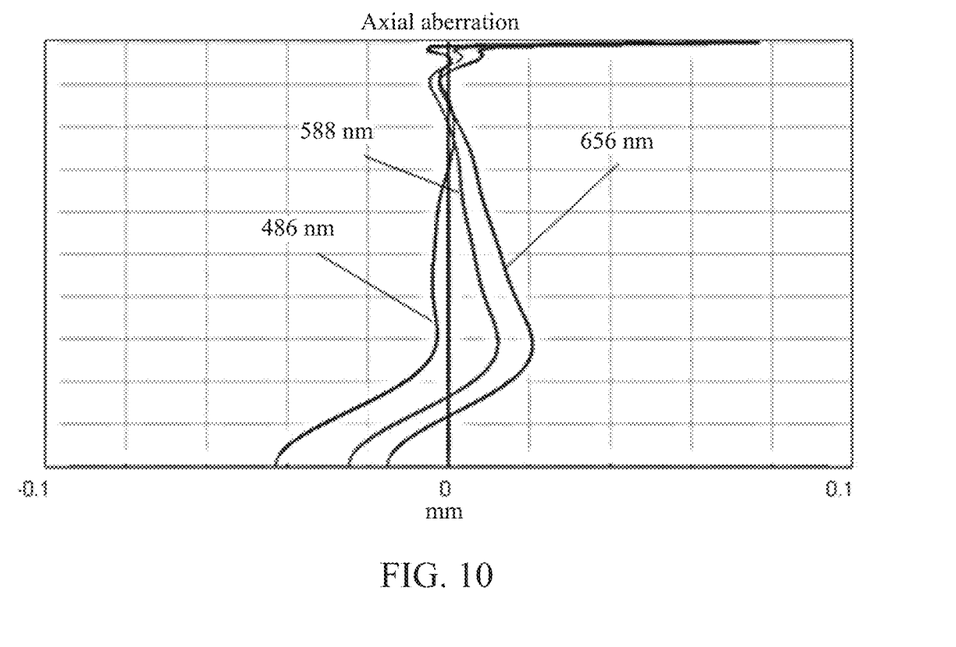
FIG. 10 is a schematic diagram of an axial aberration of the camera optical lens shown in FIG. 9.
Figure 11:
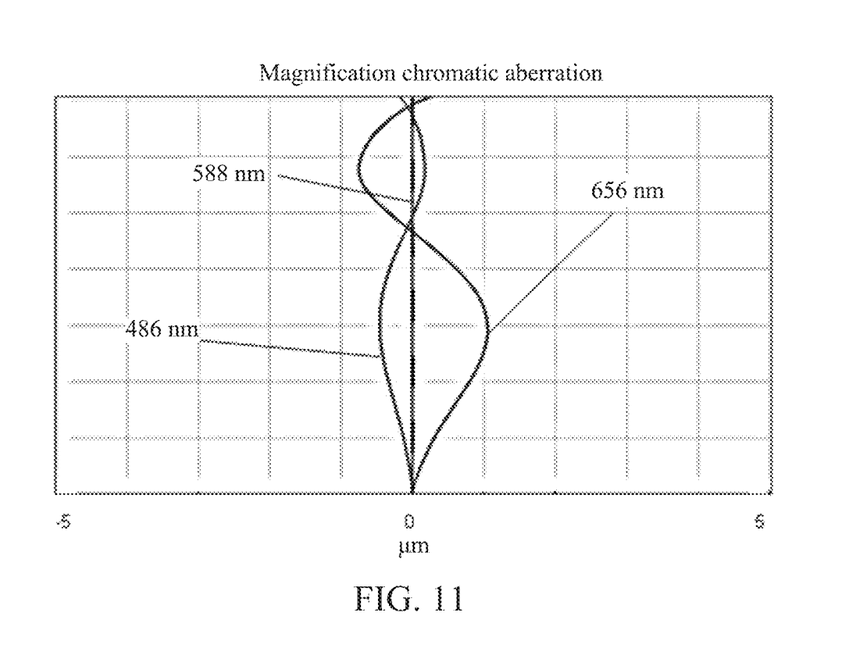
FIG. 11 is a schematic diagram of a magnification chromatic aberration of the camera optical lens shown in FIG. 9.
Figure 12:
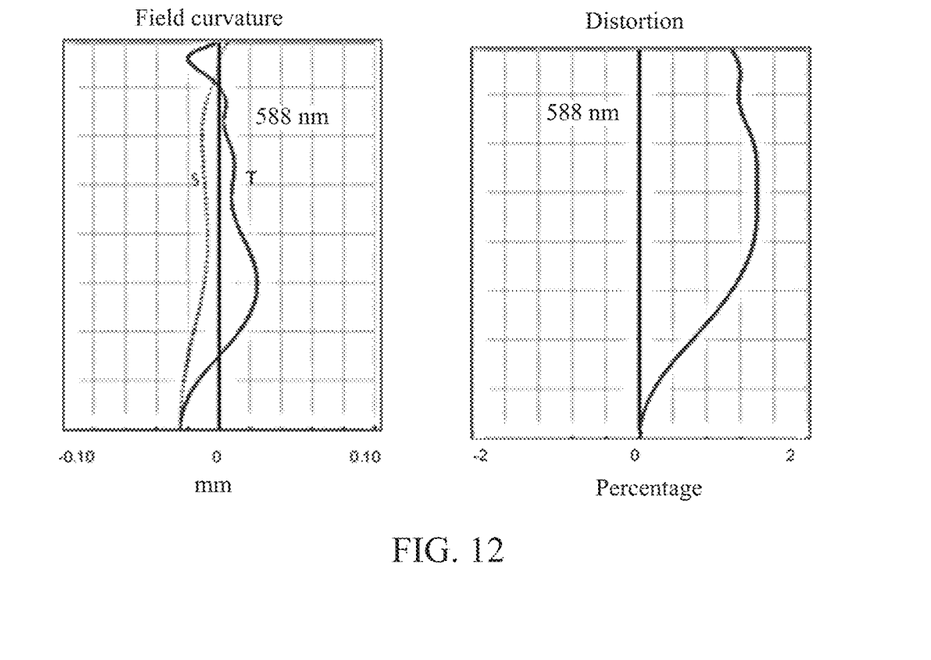
FIG. 12 is a schematic diagram of a field curvature and distortion of the camera optical lens shown in FIG. 9.

FIG. 10 and FIG. 11 are respectively schematic diagrams of axial aberrations and magnification chromatic aberrations obtained when light having wavelengths of 486 nm, 588 nm and 656 nm pass through the camera optical lens 30 in the embodiment 3. FIG. 12 is a schematic diagram of a field curvature and distortion obtained when light having a wavelength of 588 nm passes through the camera optical lens 30 in the embodiment 3.

Table 16 below lists values corresponding to the conditions in an embodiment. Apparently, the camera optical lens 30 in the embodiment satisfies the foregoing conditions.

In an embodiment, an entrance-pupil diameter of the camera optical lens is 2.4927 mm, a full-field image height is 3.552 mm, and a field of view in a diagonal direction is 78.999°. The camera optical lens has a wide angle and ultra-thin structure, with its on-axis and off-axis chromatic aberrations being sufficiently corrected, and has excellent optical properties.

TABLE 16

| Condition | Embodiment 1 | Embodiment 2 | Embodiment 3 |
|---|---|---|---|
| −15.0 ≤ f2/f1 ≤ −4.9 | −8.95 | −4.92 | −15 |
| 25.0 ≤ TTL/d2 ≤ 47.0 | 35.26 | 47.00 | 25.37 |
| 3.0 ≤ v1/v2 ≤ 7.0 | 3.99 | 3.23 | 5.43 |
| 6.0 ≤ (R3 + R4)/(R3 − R4) ≤ 20.0 | 11.70 | 6.02 | 20.00 |
| −4.0 ≤ (R1 + R2)/(R1 − R2) ≤ −1.8 | −2.36 | −2.08 | −2.58 |
| −0.2 ≤ f/f2 ≤ 0.0 | −0.10 | −0.20 | −0.06 |
| 0.1 ≤ (R11 + R12)/(R11 − R12) ≤ 0.2 | 0.14 | 0.20 | 0.10 |
| TTL/IH<1.4 | 1.39 | 1.39 | 1.39 |
| FOV≥78.586 | 78.586 | 79.000 | 78.999 |
| Fno<1.7 | 1.690 | 1.690 | 1.690 |

In the present disclosure, the total optical length TTL of the camera optical lens and the image height IH of the camera optical lens satisfy the following conditions: TTL/IH<1.4; the field of view FOV of the camera optical lens satisfies the following conditions: FOV≥78.586; and the aperture Fno of the camera optical lens satisfies the following conditions: Fno<1.7. The camera optical lens provided in the present disclosure can meet the design requirements for ultra-thin structure, wide angle, and high luminous flux while having better optical performance.

A person of ordinary skilled in the art may understand that the foregoing embodiments are specific embodiments for implementing the present disclosure, and in practical application, various variations may be made to the form and details without departing from the spirit and scope of the present disclosure.

What is claimed is:

1. An camera optical lens, comprising, in sequence from an object side to an image side:
   a first lens having positive refractive power,
   a second lens having negative refractive power,
   a third lens having positive refractive power,
   a fourth lens having negative refractive power,
   a fifth lens having positive refractive power, and
   a sixth lens having negative refractive power;
   a focal length of the first lens is f1, a focal length of the second lens is f2,
   an on-axis distance from an image side of the first lens to an object side of the second lens is d2,
   a total optical length from object side surface of the first lens to an image plane of the camera optical lens is TTL,
   an Abbe number of the first lens is v1, an Abbe number of the second lens is v2,
   a curvature radius of an object side of the second lens is R3, a curvature radius of an image side of the second lens is R4, and the following conditions are satisfied:

$$-15.0 \leq f2/f1 \leq -4.9,$$

$$25.0 \leq TTL/d2 \leq 47.0,$$

$$3.0 \leq v1/v2 \leq 7.0, \text{ and}$$

$$6.0 \leq (R3 + R4)/(R3 - R4) \leq 20.0.$$

2. The camera optical lens according to claim 1, wherein a curvature radius of an object side of the first lens is R1, a curvature radius of an image side of the first lens is R2, and the following conditions are satisfied:

$$-4.0 \leq (R1+R2)/(R1-R2) \leq -1.8.$$

3. The camera optical lens according to claim 1, wherein an entire focal length f of the camera optical lens and the focal length f2 of the second lens satisfy the following conditions:

$$-0.2 \leq f/f2 \leq 0.0.$$

4. The camera optical lens according to claim 1, wherein a curvature radius R11 of an object side of the sixth lens and a curvature radius R12 of an image side of the sixth lens satisfy the following conditions:

$$0.1 \leq (R11+R12)/(R11-R12) \leq 0.2.$$

* * * * *